US012747590B2

(12) United States Patent
Svendsen et al.

(10) Patent No.: US 12,747,590 B2
(45) Date of Patent: Sep. 29, 2026

(54) FLASHING ASSEMBLY COMPRISING A TOP FLASHING ARRANGEMENT, A ROOF ELEMENT SYSTEM COMPRISING SUCH A FLASHING ASSEMBLY, AND A METHOD OF MANUFACTURING A FLASHING ASSEMBLY

(71) Applicant: VKR Holding A/S, Hørsholm (DK)

(72) Inventors: Jan Brix Svendsen, Hornsyld (DK); Kristian Strand Grønbæk, Gedved (DK)

(73) Assignee: VKR Holding A/S (DK)

( * ) Notice: Subject to any disclaimer, the term of this patent is extended or adjusted under 35 U.S.C. 154(b) by 183 days.

(21) Appl. No.: 18/625,691

(22) Filed: Apr. 3, 2024

(65) Prior Publication Data

US 2024/0328162 A1 Oct. 3, 2024

(30) Foreign Application Priority Data

Apr. 5, 2023 (DK) ................................ 2023 70170

(51) Int. Cl.

*E04D 13/147* (2006.01)
*E04D 13/02* (2006.01)
(Continued)

(52) U.S. Cl.

CPC ....... *E04D 13/1475* (2013.01); *E04D 13/031* (2013.01); *E04D 13/02* (2013.01); (Continued)

(58) Field of Classification Search

CPC .............. E04D 13/1475; E04D 13/031; E04D 13/0315; E04D 13/03; E04D 13/14; (Continued)

(56) References Cited

U.S. PATENT DOCUMENTS 3,838,544 A * 10/1974 Hindall .............. E04D 13/1407 52/60
4,543,753 A 10/1985 Sonneborn et al.
(Continued)

FOREIGN PATENT DOCUMENTS

DE 2910610 A1 3/1979
DE 3206871 6/1983
(Continued)

OTHER PUBLICATIONS

Extend Search Report dated Jul. 19, 2024 issued in connection with European Patent Application No. 24168726.8, eight (8) pages.
(Continued)

*Primary Examiner* — Omar F Hijaz
(74) *Attorney, Agent, or Firm* — Merek, Blackmon & Voorhees, LLC

(57) ABSTRACT

A flashing assembly comprising a top flashing arrangement, a roof element system comprising such a flashing assembly, and a method of manufacturing a flashing assembly. In the flashing assembly (11), a top flashing arrangement comprises at least one pair of an inner top flashing element (111) and an outer top flashing element (112), and each inner top flashing element (111) and the associated outer top flashing element (112) are configured to be interconnected in a telescopic joint (115).

16 Claims, 6 Drawing Sheets

(51) Int. Cl.

| | |
|---|---|
| ***E04D 13/03*** | (2006.01) |
| ***E04D 13/14*** | (2006.01) |
| ***E04D 13/15*** | (2006.01) |
| ***E06B 1/34*** | (2006.01) |

(52) U.S. Cl.
CPC .......... *E04D 13/03* (2013.01); *E04D 13/0315* (2013.01); *E04D 13/14* (2013.01); *E04D 13/15* (2013.01); *E06B 1/342* (2013.01)

(58) Field of Classification Search
CPC ..... E04D 13/02; E04D 13/1407; E04D 13/15; E06B 2001/628; E06B 1/342
See application file for complete search history.

(56) References Cited

U.S. PATENT DOCUMENTS

| | | | | | |
|---|---|---|---|---|---|
| 4,703,592 | A * | 11/1987 | Sampson | E04D 13/0305 | 52/20 |
| 4,781,008 | A * | 11/1988 | Lyons, Jr. | E04D 13/0315 | 52/656.1 |
| 4,972,638 | A * | 11/1990 | Minter | E04D 13/1475 | 52/200 |
| 5,065,553 | A * | 11/1991 | Magid | E04D 13/1407 | 52/60 |
| 5,522,189 | A * | 6/1996 | Mortensen | E04D 13/031 | 52/537 |
| 6,263,624 | B1 * | 7/2001 | Hoy | E04D 13/1475 | 52/200 |
| 6,374,549 | B1 * | 4/2002 | Mayle | E04D 13/1407 | 52/287.1 |
| 6,941,713 | B2 * | 9/2005 | Williams | E06B 1/62 | 52/302.6 |
| 7,059,086 | B2 * | 6/2006 | Edvardsen | E04D 13/1475 | 52/60 |
| 10,626,617 | B2 * | 4/2020 | MeGee | E04D 13/15 | |
| 11,795,695 | B2 * | 10/2023 | Henriksen | E04D 13/1475 | |
| 2014/0259973 | A1 * | 9/2014 | Duarte | E04D 13/1473 | 52/173.3 |

FOREIGN PATENT DOCUMENTS

| | | | | |
|---|---|---|---|---|
| DK | 154099 | | 10/1988 | |
| DK | 179519 | B1 * | 2/2019 | E04D 13/147 |
| EP | 0087647 | B1 | 4/1985 | |
| EP | 1550777 | | 7/2005 | |
| EP | 1581707 | B1 | 10/2009 | |
| EP | 1521888 | | 11/2010 | |
| EP | 2481864 | | 8/2012 | |
| EP | 3061886 | A1 | 8/2016 | |
| EP | 3480388 | | 5/2019 | |
| EP | 3567180 | | 11/2019 | |
| FR | 2473595 | | 7/1981 | |
| FR | 2916464 | | 11/2008 | |
| PL | 217499 | B1 | 7/2014 | |
| PL | 226250 | B1 | 6/2017 | |
| PL | 70359 | | 11/2018 | |
| SE | 416072 | B | 11/1980 | |
| WO | WO95/28535 | | 10/1995 | |
| WO | WO03/074812 | | 9/2003 | |
| WO | WO2020/071932 | A1 | 4/2020 | |

OTHER PUBLICATIONS

U.S. Appl. No. 18/626,522, filed Apr. 4, 2024.
Machine translation of FR2916464.
U.S. Appl. No. 18/621,211, filed Mar. 29, 2024.
European Search Report dated Sep. 10, 2024 that issued in connection with European Patent Application No. 24168729.2.
Machine translation of DE2910610A1.
Machine translation of PL226250B1.
European Search Report dated Sep. 3, 2024 that issued in connection with European Patent Application No. 24166292.3.
Machine translation of description of SE416072B.
Machine translation of description of PL217499B1.
Machine translation of FR2473595.
Machine translation DE3206871.
Office Action dated Feb. 20, 2026 issued in European Patent Application No. 24168729.2.

* cited by examiner

FLASHING ASSEMBLY COMPRISING A TOP FLASHING ARRANGEMENT, A ROOF ELEMENT SYSTEM COMPRISING SUCH A FLASHING ASSEMBLY, AND A METHOD OF MANUFACTURING A FLASHING ASSEMBLY

TECHNICAL FIELD

The present invention relates to a flashing assembly for a roof element, such as a roof window, configured for mounting in a sloped roof structure defining a slope direction and comprising a frame having a top frame member and a bottom frame member both extending horizontally in the mounted state of the roof element in a width direction, and two side frame members extending in the slope direction in the mounted state of the roof element, said flashing assembly comprising a top flashing arrangement configured for extending along the top frame member in the mounted state of the flashing assembly. The invention furthermore relates to a roof element system and to a method of manufacturing a flashing assembly.

BACKGROUND ART

When roof elements such as roof windows are mounted in a sloped roof, an opening is cut in the roof structure, and the roofing, which may be made from tiles or like roofing material, is interrupted. After mounting of the roof elements in the opening, a flashing assembly is used for sealing the joint between the roof window and the roof and thus ensuring a waterproof transition between the roof elements and the surrounding roofing. Each flashing element typically comprises an inner portion, which is arranged to extend up along the frame of the roof window, and an outer portion, which is arranged to extend away from frame.

When roof elements are to be mounted in larger or more complex groups, such as in a matrix constellation with roof elements mounted both side by side and above each other in the slope direction, flashing assemblies may be made on special order. In turn, the number of different components that need to be manufactured, stored and delivered is relatively high.

Applicant's earlier EP 3 480 388 A1 and WO 95/28535 A1 are examples of well-performing flashing assemblies that to some extent alleviate the challenges of varying installation configurations of such roof elements. However, there is still room for improvement.

SUMMARY OF INVENTION

With this background, it is therefore an object of the invention to provide a flashing assembly which is able to accommodate a larger number of varying configurations in the installation of roof elements.

In a first aspect, this and further objects are met by a flashing assembly of the kind mentioned in the introduction which is furthermore characterised in that the top flashing arrangement comprises at least one pair of an inner top flashing element and an outer top flashing element, and that each inner top flashing element and the associated outer top flashing element are interconnected in a telescopic joint.

By this design, one and the same top flashing arrangement may be utilised when installing two roof elements side by side, in which the top frame member is located at different heights in the direction of the slope of the roof. By telescopic joint is to be understood as any connection between two components allowing adjustment of their positions relative to each other. This is particularly advantageous in view of the growing focus on sustainability, partly because the number of different components that need to be manufactured and kept in stock is reduced, partly because the invention makes it possible to install traditional roof windows adjacent for instance solar panels and/or solar collectors, but also roof windows of a smaller or larger height in the slope direction. While it has hitherto been quite a challenge to provide suitable flashing for roof elements having different positions in the slope direction, the present invention provides for a well-functioning, adaptable and reliable adjustment.

In one embodiment, each inner top flashing element comprises a first leg configured for extending up along an outer side of the top frame member, and a second leg configured for extending substantially in plane with the roof structure and comprising engagement means configured to form part of the telescopic joint. In this way, the outer top flashing member may be placed on top of the second leg of the inner top flashing member, thus covering the engagement means. In this way, optimum flexibility in the adaptability of the top flashing arrangement is achieved.

In another embodiment, each outer top flashing element comprises a substantially plane base provided with top engagement means at an inner edge portion configured to form part of the telescopic joint. In particular in combination with a configuration of the inner top flashing member as comprising a substantially plane second leg, the telescopic joint achieved is particularly easily established during installation of the flashing assembly on the roof element.

In a further development of these embodiments, an outer edge portion of the second leg is bent to form the engagement means of the inner top flashing element to engage with the engagement means formed by a bent inner edge portion of the outer top flashing element. This provides for a mechanically simple and reliable connection.

In another embodiment, each inner top flashing element comprises a corner section at each side, the corner section being separated from the second leg by a ridge portion. Incorporating such a corner section into the top flashing arrangement provides adequate weatherproofing at the corner of the frame element and also provides the opportunity to connect to flashings at the sides of the frame.

In order to ensure easy and reliable connection between the outer top flashing element and a corner section, each outer top flashing element may comprise side engagement means at opposite side edge portions of the base to engage with side engagement means of the corner section of the inner top flashing element, said side engagement means of the corner section being preferably formed by an edge portion of the corner section.

In a preferred further development of the latter embodiment, the outer top flashing element may be provided with a cut-out with an extension in the width direction substantially corresponding to or exceeding a width of the corner section.

Alternatively or additionally, the width of the cut-out may substantially correspond to a spacing between an end of the top engagement means and the side engagement means. In this way, optimum engagement and adaptability conditions are achieved.

In a presently preferred embodiment, the inner top flashing element is configured to cooperate with a side flashing element, optionally at a corner section.

In one particularly advantageous further development of this preferred embodiment, the inner top flashing element, the outer top flashing element and the side flashing element are configured to cooperate with an extension flashing element, preferably by engagement of a side edge of the extension flashing element with a slit-shaped pocket formed between a lower outer edge and the edge portion of the corner section. The extension flashing element may constitute a gutter element to be positioned between neighbouring roof elements, or a transition element to the surrounding roofing. Additionally, it may function as a locking element for fixing the outer and inner top flashing elements in their selected relative position.

The degree of adaptability of the top flashing arrangement may be chosen according to specific requirements. It is preferred that the inner top flashing element and the outer flashing element define a maximum measure (Dmax) in the slope direction, corresponding to a position in which the outer flashing element overlaps the inner flashing element to a minor extent and the telescopic joint is fully established.

While the dimensions of the inner and outer top flashing elements may in principle be chosen independently of each other, it is preferred that the inner top flashing element and the outer flashing element define a minimum measure in the slope direction, corresponding to a position in which the outer flashing element overlaps the inner flashing element to a major extent and the telescopic joint is inactive. In particular, it is preferred that the dimensions in the slope direction lie in the same size range.

Examples of suitable values are given in embodiments in which the maximum measure lies in the range 200 to 250 mm, and wherein the minimum measure preferably lies in the range 100 to 125 mm and/or a measure of the joint lies in the range 20 to 80 mm.

In a second aspect, a roof element system is devised.

In a third aspect, a method of manufacturing is devised.

Other presently preferred embodiments and further advantages will be apparent from the subsequent detailed description and drawings.

A feature described in relation to one of the aspects may also be incorporated in the other aspect, and the advantage of the feature is applicable to all aspects in which it is incorporated.

BRIEF DESCRIPTION OF DRAWINGS

In the following description embodiments of the invention will be described with reference to the schematic drawings, in which.

DESCRIPTION OF EMBODIMENTS

Figure 1:
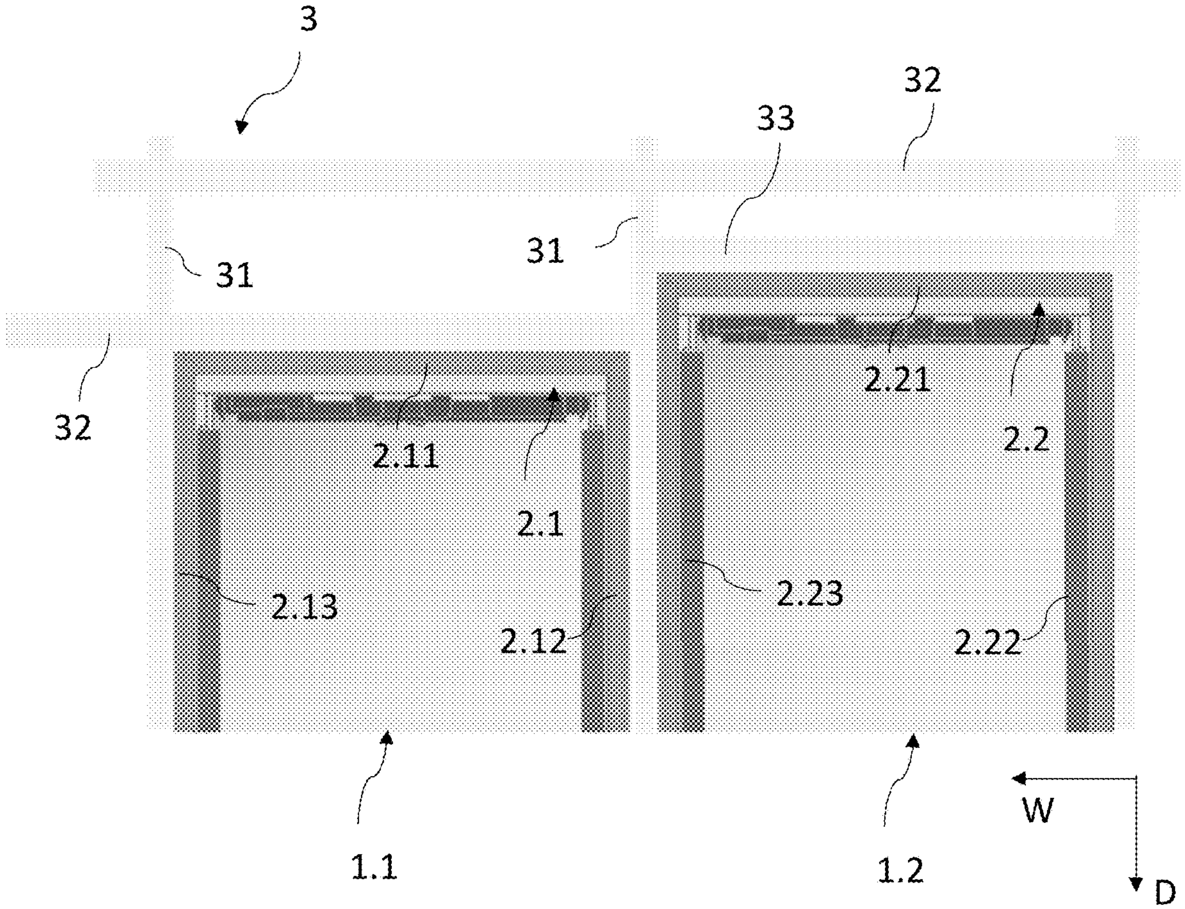
FIG. 1 is a schematic plan view of a roof element system to be used with a flashing assembly according to the invention.
Figure 2:
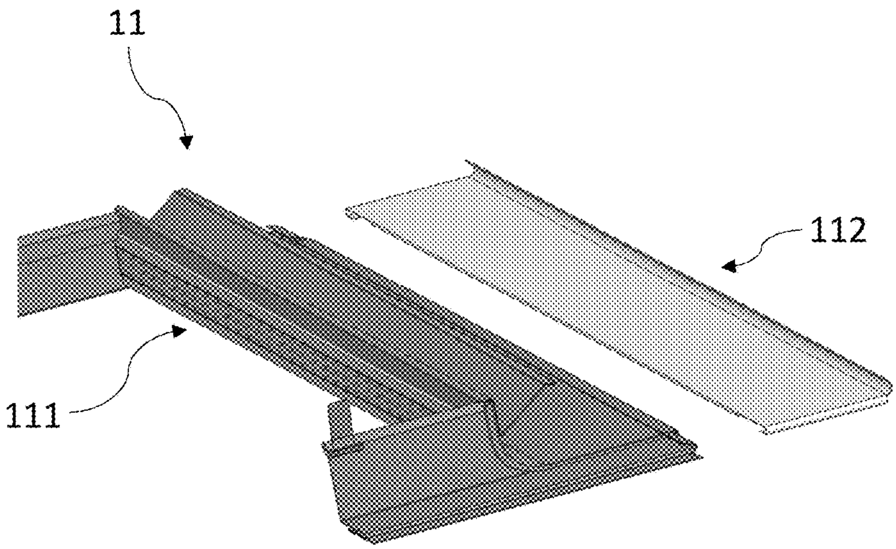
FIG. 2 is an exploded perspective view of a flashing assembly in an embodiment of the invention.
Figure 3:
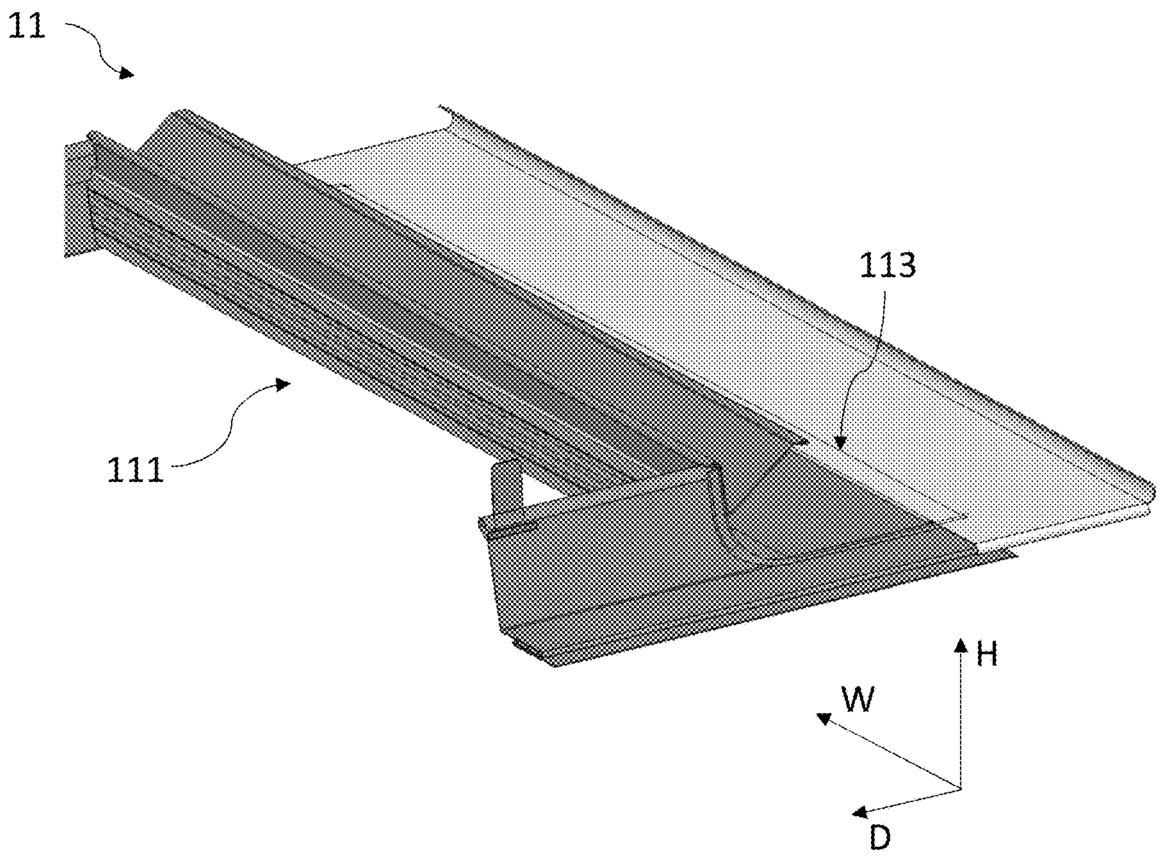
FIG. 3 is a perspective view of the flashing assembly of FIG. 2 in a first engaged position.
Figure 4:
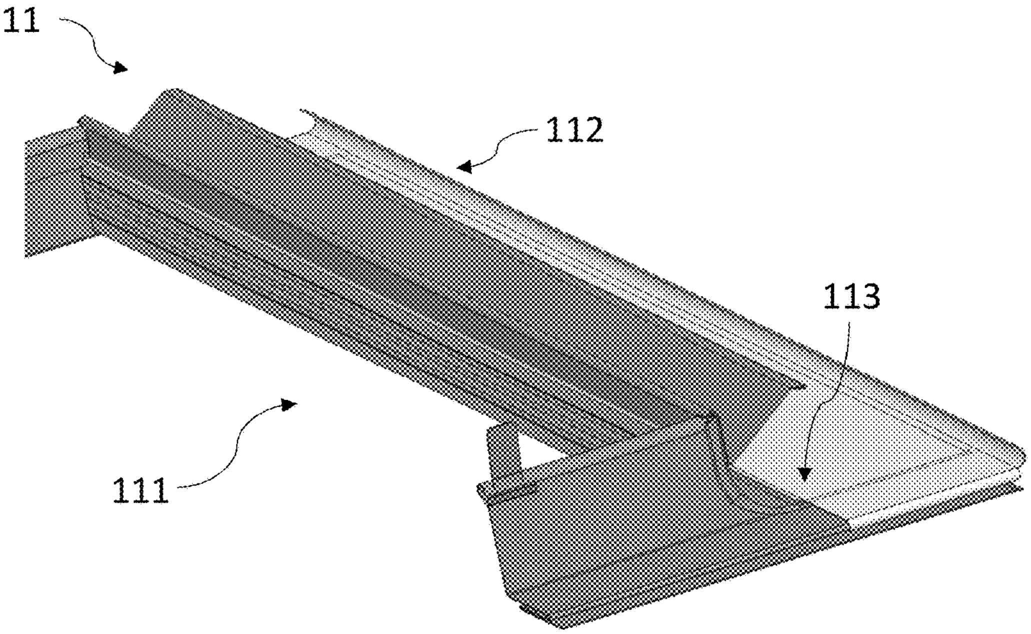
FIG. 4 is a perspective view of the flashing assembly of FIG. 2 in a second engaged position.

In the following detailed description, preferred embodiments of the present invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations.

It is noted that terms such as "up", "down", "left-hand", "right-hand", "exterior", "interior", "outer", "inner" are relative and refers to the viewpoint in question.

In FIG. 1, a roof element system of an embodiment of the invention comprising two roof elements is shown. In the following, the roof elements will be referred to as two roof windows 1.1, 1.2, but they could also be solar panels in the form of photovoltaic panels, or solar collectors. More than two roof elements could be present in the roof element system. The roof windows 1.1, 1.2 are shown in a mounted state in a roof structure 3, adjacent to each other in a width direction W. Each roof window 1.1, 1.2 is represented by a frame 2.1, 2.2 having a top frame member 2.11, 2.21 extending horizontally in the mounted state of the roof window 1.1, 1.2, i.e. in the width direction W. The frame further comprises a bottom frame member (not shown) which extends in parallel with the top frame member 2.11, 2.21, and two side frame members 2.12, 2.13, 2.22, 2.23 extending in a slope direction D defined by the inclination of the roof structure 3.

The roof structure 3 is represented by only a few rafters 31, laths 32 and a header 33. The roof structure 3 may be configured differently and/or comprise other components such as boarding etc.

As shown in FIG. 1, the top frame member 2.11 of one roof window 1.1 is located at a different position in the slope direction D than the top frame member 2.21 of the neighbouring roof window 1.2 in the embodiment shown.

As will be described in further detail below, a flashing assembly is provided for use in the roof element system shown in FIG. 1. The inventive flashing assembly is configured such that one and the same flashing assembly may be used for both roof windows 1.1, 1.2. However, the flashing assembly is applicable also to single roof elements.

Referring now to FIGS. 2 to 7, embodiments of a flashing assembly 11 comprising a top flashing arrangement will be described in detail.

Depending on the number of roof elements in the system, the top flashing arrangement comprises a suitable number of pairs of an inner top flashing element 111 and an outer top flashing element 112. In the following, reference will be made to one top flashing arrangement. It is noted that the top flashing arrangement adapted to be associated with a neighbouring roof element may comprise fewer or more components.

The inner top flashing element 111 and the associated outer top flashing element 112 are configured to be interconnected in a telescopic joint 115.

In the embodiment shown, each inner top flashing element 111 comprises a first leg 1111 configured for extending up along an outer side of the top frame member 2.11 or 2.21, and a second leg 1112 configured for extending substantially in plane with the roof structure 3 and comprising engagement means 1112*a* configured to form part of the telescopic joint 115. The first and second legs 1111 and 1112 extend substantially perpendicularly to each other and are connected in a slightly curved transition portion such that a concave side is formed, facing outwards.

The outer top flashing element 112 comprises a substantially plane base 1120 provided with top engagement means 1120*a* at an inner edge portion configured to form part of the telescopic joint 115.

An outer edge portion of the second leg 1112 is bent, upwards and inwards towards the concavity, to form the engagement means 1112*a* of the inner top flashing element 111 that are adapted to engage with the engagement means 1120*a* formed by a bent inner edge portion of the outer top flashing element 112. The inner edge portion is bent downwards and upwards as indicated in the drawn position. The length of the bent portions and thus of the respective engagement means may vary according to the specific field of application and will be described in further detail below. By the term "bent" is to be understood any manufacturing process adapted to form a portion having a different direction than the main part of the component. The bending process could result in a relatively sharp structure, or a curved structure.

Figure 7:
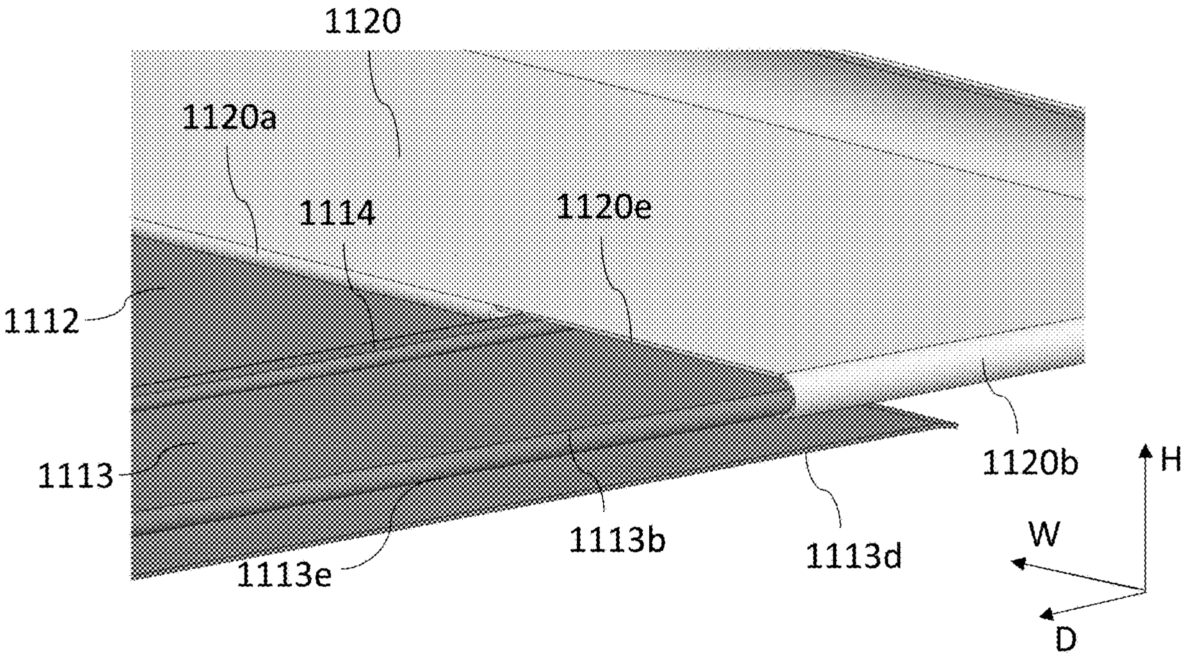
FIG. 7 is a partial perspective view of an embodiment of the flashing assembly according to the invention.

In the embodiments shown in the figures, the inner top flashing element 111 further comprises a corner section 1113 at each side, the corner section 1113 being separated from the second leg 1112 by a ridge portion 1114 as indicated in FIG. 7. The corner section 1113 is adjoined by an upstanding portion 1113*a* connected to the first leg 1111 of the inner top flashing element 111. The corner section 1113 is positioned substantially in the same plane as the second leg 1112 of the inner top flashing element 111 and is configured to be located beyond the ends of the top frame member 2.11 or 2.21 in the mounted state of the flashing assembly.

Figure 5:
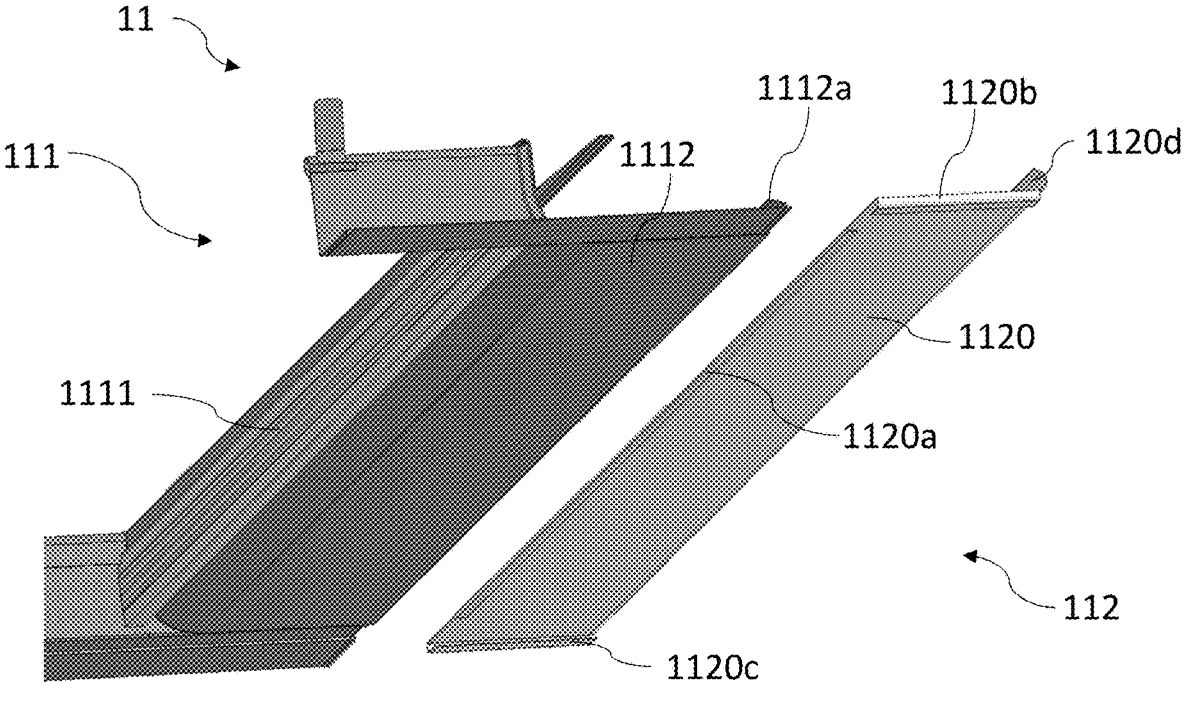
FIG. 5 is a view corresponding to FIG. 2, seen from another angle.
Figure 6:
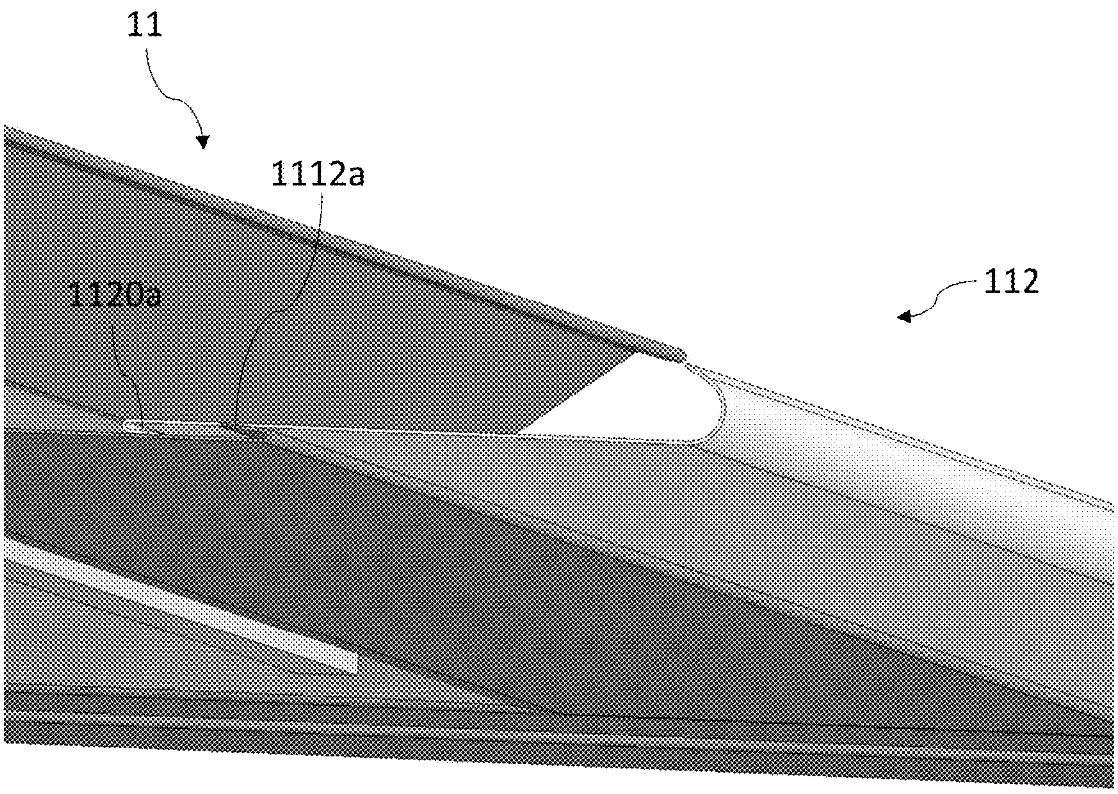
FIG. 6 is a partial perspective view of an embodiment of the flashing assembly according to the invention.

Referring specifically to FIG. 5 showing the top flashing arrangement from below, it is seen how the outer top flashing element 112 in the embodiment shown comprises side engagement means 1120*b*, 1120*c* at opposite side edge portions of the base 1120. As best shown in FIG. 7, the shown side engagement means 1120*b* are adapted to engage with side engagement means 1113*b* of the corner section 1113 of the inner top flashing element 111. The side engagement means of the corner section 1113 are here formed by an edge portion 1113*b* of the corner section 1113. The side engagement means 1120*b*, 1120*c* are formed by a suitable process such that the position of the outer top flashing element 112 is able to be adjusted by sliding the side engagement means 1120*b*, 1120*c* along the edge portion 1113*b* and the counterpart edge portion at the other side, but which preferably still maintains the outer top flashing element 112 in engagement with the inner top flashing element 111.

To accommodate the corner section 1113 in the sliding engagement, in particular where a ridge portion 1114 as described in the above is provided and where the edge portion 1113*b* protrudes above the plane of the corner section 1113, the outer top flashing element 112 is provided with a cut-out 1120*e* with an extension in the width direction W substantially corresponding to or exceeding a width of the corner section 1113. This is shown in particular detail in FIG. 7.

The extension of the top engagement means 1120*a* of the outer top flashing element 112 may be chosen such that the engagement means extend over a length corresponding to the major part of the second leg 1112 of the inner top flashing element 111. In this case, the width of the cut-out 1120*e* substantially corresponds to a spacing between an end of the top engagement means 1120*a* and the side engagement means 1120*b*.

Figure 8:
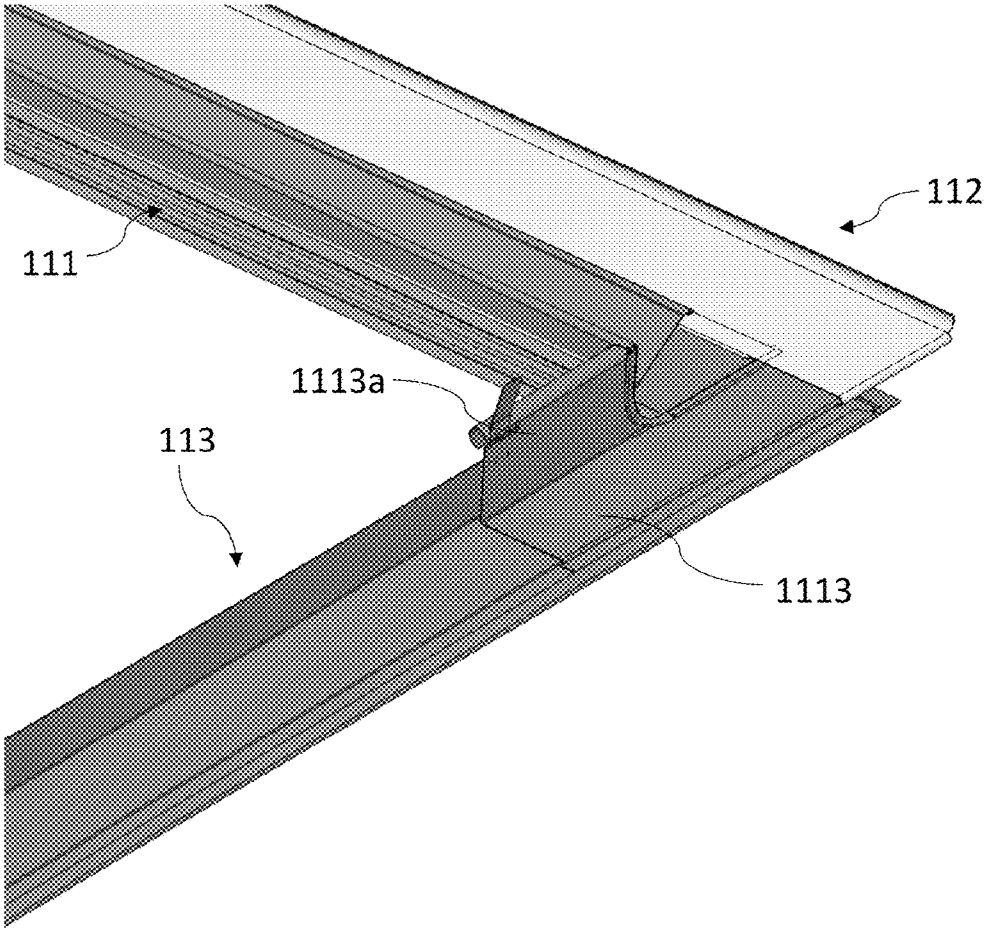
FIG. 8 is a perspective view of a further embodiment of the flashing assembly according to the invention.

Turning now to FIG. 8, it is shown how the flashing assembly comprises also flashing elements at the sides in a further embodiment.

The inner top flashing element 111 is configured to cooperate with a side flashing element 113. In a manner known per se, the side flashing element is provided with an upstanding portion and a protruding leg portion. Here, the side flashing element 113 is configured to be overlapped in part at the corner section 1113 of the inner top flashing element 111.

Figure 9:
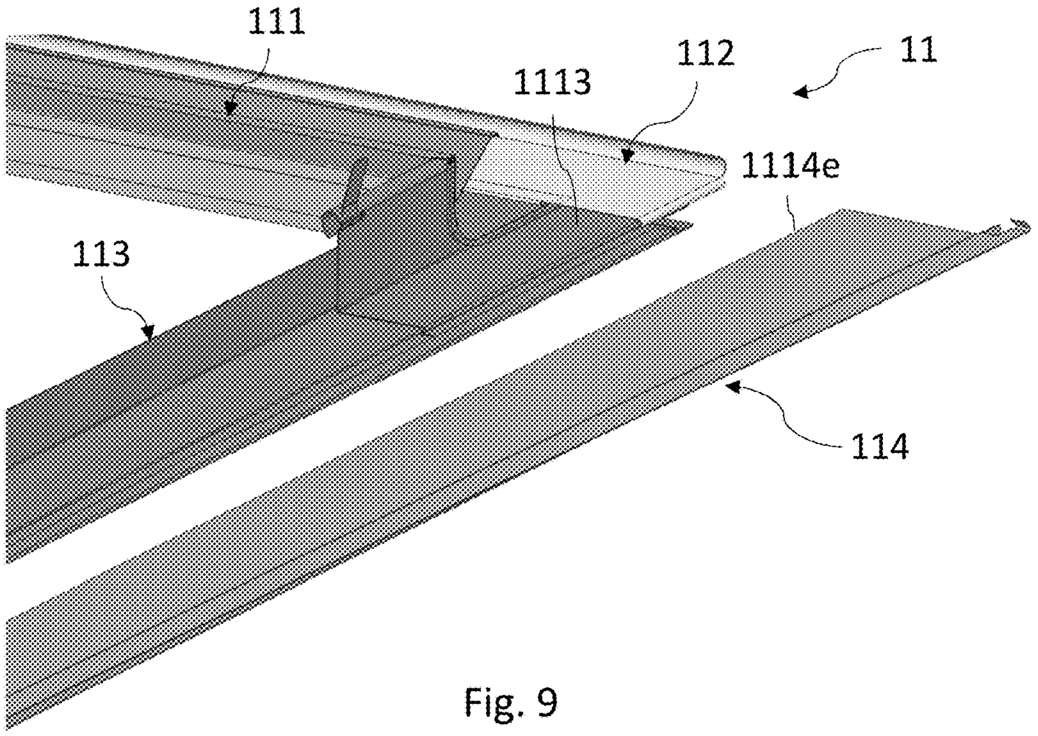
FIGS. 9 and 10 are perspective views of a still further embodiment of the flashing assembly according to the invention.
Figure 10:
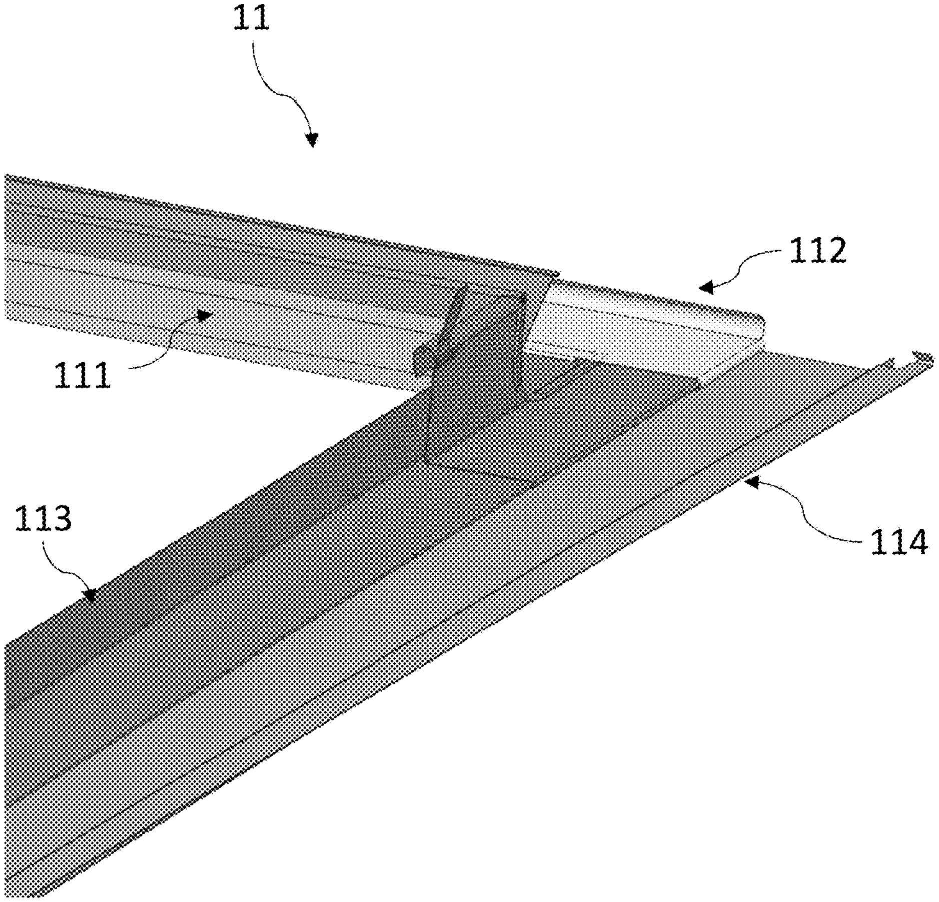

In a still further embodiment, shown in FIGS. 9 and 10, the inner top flashing element 111, the outer top flashing element 112 and the side flashing element 113 are configured to cooperate with an extension flashing element 114. The extension flashing element 114 may constitute a gutter element to be positioned between neighbouring roof elements, or a transition element to the surrounding roofing. Additionally, it may function as a locking element for fixing the outer and inner top flashing elements in their selected relative position. The connection between the inner top flashing element 111, the outer top flashing element 112 and the side flashing element 113 on one hand and the extension flashing element 114 on the other is in the embodiment shown provided by engagement of a side edge 1114*e* of the extension flashing element 114 with a slit-shaped pocket 1113*e* formed between a lower outer edge 1113*d* and the edge portion 1113*b* of the corner section 1113.

The flashing assembly may comprise a bottom flashing arrangement as well (not shown) connected to the side flashing elements and any extension flashing elements.

Figure 11:
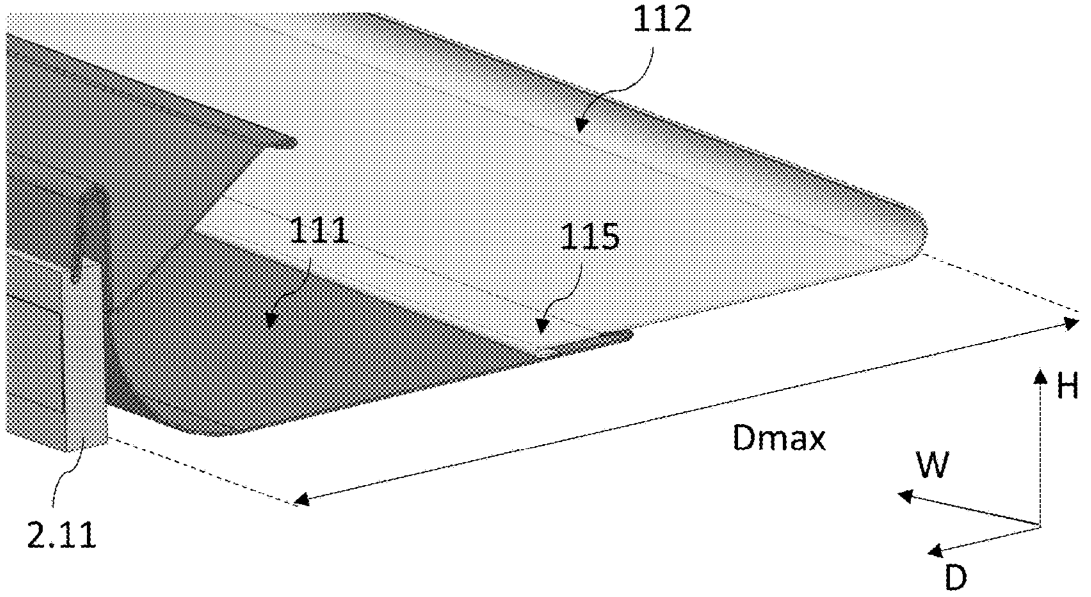
FIG. 11 is a sectional perspective view of the flashing assembly in an embodiment of the invention.
Figure 12:
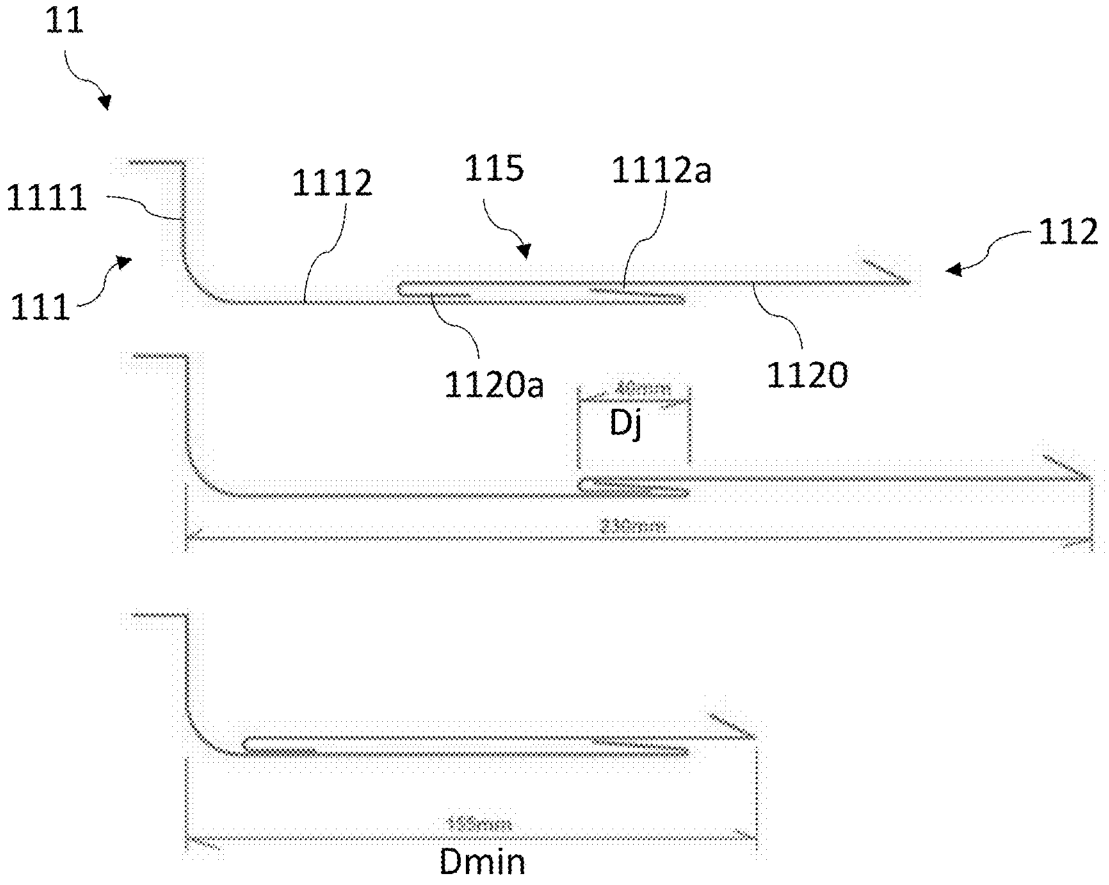
FIG. 12 is an overview of the flashing assembly in an embodiment in three different engaged positions.

Turning now to FIGS. 11 and 12, the adaptability of the dimension of the top flashing arrangement in the slope direction D will be described in some detail. The inner top flashing element 111 and the outer flashing element 112 define a maximum measure Dmax in the slope direction D, corresponding to a position in which the outer flashing element 112 overlaps the inner flashing element 111 to a minor extent and the telescopic joint 115 is established to its full extent.

The inner top flashing element 111 and the outer flashing element 112 define a minimum measure Dmin in the slope direction D, corresponding to a position in which the outer flashing element 112 overlaps the inner flashing element 111 to a major extent and the telescopic joint 115 is inactive.

The maximum measure Dmax typically lies in the range 200 to 250 mm, and wherein the minimum measure Dmin preferably lies in the range 100 to 125 mm and/or a measure Dj of the joint 115 lies in the range 20 to 80 mm.

All in all, the particular configuration of the flashing assembly 11 entails that the inner top flashing element 111 and the outer top flashing element 112 of the top flashing arrangement associated with one roof element 1.1 are positioned at a different telescopic relationship than in the top flashing arrangement associated with the other roof element 1.2. For instance, the top flashing arrangement of the flashing assembly 11 in the position shown in FIG. 3 may be used for the left-hand roof window 1.1 in FIG. 1, while the flashing assembly 11 in the position shown in FIG. 4 may be used for the right-hand roof window 1.2.

In the following, a method of manufacturing a flashing assembly as described in the above will be described in some detail.

The inner top flashing element 111 and optionally the corner sections 1113 are formed as an integral piece of a sheet metal material, and the outer top flashing element 112 as a separate piece of sheet metal material, the inner top flashing element 111 and the outer top flashing element 112 being supplied in a detached state and configured to be connected in the mounted state by overlapping the inner top flashing element 111 by the outer and outer top flashing element 112 and optionally engagement of the telescopic joint 115.

The invention is not limited to the embodiments shown and described in the above, but various modifications and combinations may be carried out.

LIST OF REFERENCE NUMERALS

- 1.1 roof element/roof window
- 1.2 roof element/roof window
- 2.1 frame
  - 2.11 top frame member
  - 2.12 side frame member
  - 2.13 side frame member
- 2.2 frame
  - 2.21 top frame member
  - 2.22 side frame member
  - 2.23 side frame member
- 3 roof structure
  - 31 rafter
  - 32 lath
  - 33 header
- 11 flashing assembly
  - 111 inner top flashing element
  - 1111 first leg
  - 1112 second leg
  - 1112*a* engagement means
  - 1113 corner section
  - 1113*a* upstanding portion
  - 1113*b* side engagement means/edge portion of corner section
  - 1113*d* lower outer edge
  - 1113*e* slit-shaped pocket
  - 1114 ridge portion
  - 112 outer top flashing element
  - 1120 base
  - 1120*a* top engagement means
  - 1120*b* side engagement means
  - 1120*c* side engagement means
  - 1120*d* bent outer edge portion
  - 1120*e* cut-out
  - 113 side flashing element
  - 114 extension flashing element
  - 1114*e* side edge
  - 115 telescopic joint
- D slope direction
- W width direction
- H height direction
- Dmax maximum measure
- Dmin minimum measure
- Dj measure of joint

The invention claimed is:

1. A flashing assembly for a roof element configured for mounting in a sloped roof structure defining a slope direction and comprising a frame having a top frame member and a bottom frame member both extending horizontally in a mounted state of the roof element in a width direction, and two side frame members extending in the slope direction in the mounted state of the roof element, said flashing assembly comprising a top flashing arrangement configured for extending along the top frame member in the mounted state of the flashing assembly, the top flashing arrangement comprises at least one pair of an inner top flashing element and an outer top flashing element, that each inner top flashing element and an associated outer top flashing element are configured to be interconnected in a telescopic joint, wherein each inner top flashing element comprises a first leg configured for extending up along an outer side of the top frame member, and a second leg configured for extending substantially in plane with the sloped roof structure and comprising engagement means configured to form part of the telescopic joint, wherein each outer top flashing element comprises a substantially plane base provided with top engagement means at an inner edge portion configured to form part of the telescopic joint, and, wherein an outer edge portion of the second leg is bent to form the engagement means of the inner top flashing element to engage with the top engagement means formed by a bent inner edge portion of the outer top flashing element.

2. The flashing assembly according to claim 1, wherein each inner top flashing element comprises a corner section at each side, the corner section being separated from the second leg by a ridge portion.

3. The flashing assembly according to claim 2, wherein each outer top flashing element comprises side engagement means at opposite side edge portions of the substantially plane base to engage with side engagement means of the corner section of the inner top flashing element, said side engagement means of the corner section being formed by an edge portion of the corner section.

4. The flashing assembly according to claim 3, wherein each outer top flashing element is provided with a cut-out with an extension in the width direction substantially corresponding to or exceeding a width of the corner section.

5. The flashing assembly according to claim 4, wherein the width of the cut-out substantially corresponds to a spacing between an end of the top engagement means and the side engagement means.

6. The flashing assembly according to claim 1, wherein the inner top flashing element is configured to cooperate with a side flashing element at a corner section to provide flashing about a corresponding portion of the roof element.

7. The flashing assembly according to claim 6, wherein the inner top flashing element, the outer top flashing element and the side flashing element are configured to cooperate with an extension flashing element by engagement of a side edge of the extension flashing element with a slit-shaped pocket formed between a lower outer edge and an edge portion of the corner section to provide flashing about a corresponding portion of the roof element.

8. The flashing assembly according to claim 1, wherein the inner top flashing element and the outer flashing element define a maximum measure in the slope direction, corresponding to a position in which the outer flashing element overlaps the inner flashing element to a minor extent.

9. The flashing assembly according to claim 8, wherein the inner top flashing element and the outer flashing element define a minimum measure in the slope direction, corresponding to a position in which the outer flashing element overlaps the inner flashing element to a major extent.

10. The flashing assembly according to claim 9, wherein the maximum measure lies in the range 200 to 250 mm, and wherein the minimum measure lies in the range 100 to 125 mm and/or a measure of the joint lies in the range 20 to 80 mm.

11. The flashing assembly of claim 1, wherein the roof element is a roof window.

12. The flashing assembly according to claim 1, wherein the top engagement means includes a lowermost portion extending away from the top frame member in the mounted state of the flashing assembly and the engagement means of the inner top flashing element having an uppermost portion extending towards the top frame member in the mounted state of the flashing assembly.

13. A roof element system comprising at least a first roof element and a second roof element mounted adjacent to each other in a width direction of a sloped roof structure, each of the first roof element and the second roof element comprising a frame having a top frame member extending horizontally, wherein the top frame member of the first roof element is located at a different position in the slope direction than the top frame member of the second roof element, and wherein a flashing assembly according to claim 1 is provided such that the inner top flashing element and the outer top flashing element of the top flashing arrangement associated with the first roof element are positioned at a different telescopic relationship than in the top flashing arrangement associated with the second roof element so that an uppermost portion of the outer top flashing element of the top flashing arrangement associated with the first roof element is positioned a first distance from the top frame member of the first roof element and an uppermost portion of the outer top flashing element of the top flashing arrangement associated with the second roof element is positioned a second distance from the top frame member of the second roof element, wherein the first distance is greater than said second distance, and wherein the first and second distances are defined by a line extending perpendicular to an outer side of a corresponding roof element.

14. The roof element system of claim 13, wherein each of the at least two roof elements is a roof window.

15. A flashing assembly for a roof element configured for mounting in a sloped roof structure defining a slope direction and comprising a frame having a top frame member and a bottom frame member both extending horizontally in a mounted state of the roof element in a width direction, and two side frame members extending in the slope direction in the mounted state of the roof element, said flashing assembly comprising a top flashing arrangement configured for extending along the top frame member in the mounted state of the flashing assembly, the top flashing arrangement comprises at least one pair of an inner top flashing element and an outer top flashing element, that each inner top flashing element and an associated outer top flashing element are configured to be interconnected in a telescopic joint, wherein each inner top flashing element comprises a first leg configured for extending up along an outer side of the top frame member, and a second leg configured for extending substantially in plane with the sloped roof structure and comprising engagement means configured to form part of the telescopic joint, wherein each outer top flashing element comprises a substantially plane base provided with top engagement means at an inner edge portion configured to form part of the telescopic joint, and, wherein an outer edge portion of the second leg is bent to form the engagement means of the inner top flashing element to engage with the top engagement means formed by a bent inner edge portion of the outer top flashing element to permit adjustment of the telescopic joint in a direction perpendicular to a length dimension of said first leg and a length dimension of the top frame member.

16. The flashing assembly according to claim 15, wherein the top engagement means includes a lowermost portion extending away from the top frame member in the mounted state of the flashing assembly and the engagement means of the inner top flashing element having an uppermost portion extending towards the top frame member in the mounted state of the flashing assembly.

* * * * *